3,164,634
AMINE-HALOGENATED POLYPHENYL
REACTION PRODUCTS
Bart J. Bremmer, Midland, Mich., assignor to The Dow
Chemical Company, Midland, Mich., a corporation of
Delaware
No Drawing. Filed Oct. 11, 1962, Ser. No. 229,982
11 Claims. (Cl. 260—570.5)

This invention relates to new chemical compounds and it particularly concerns a class of compounds resulting from the reaction of polyhalogenated polyphenyls with alkylene polyamines or alkanolamines and the method whereby these new compounds are made.

These novel compounds have the formula

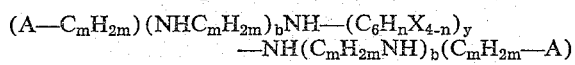

$(A-C_mH_{2m})(NHC_mH_{2m})_bNH-(C_6H_nX_{4-n})_y$
$-NH(C_mH_{2m}NH)_b(C_mH_{2m}-A)$ wherein $b$ and $n$ are numbers from zero to about three, $m$ is a number from two to about six, $y$ is a number from two to about three, A is selected from the group consisting of a hydroxyl group and an $-NH_2$ group, and X is chlorine or bromine.

These compounds are most conveniently prepared by reacting a polyhalogenated polyphenyl with an alkylene polyamine or alkanolamine, such as ethylenediamine, diethylenetriamine, triethylenetetramine, 1,3 - propanediamine, 1,6 - hexanediamine, propylenediamine, ethanolamine, N-(2-hydroxyethyl)ethylenediamine, N-(2-hydroxyethyl)-diethylenetriamine, and the like. Polyhalogenated polyphenyls, preferably biphenyls and terphenyls or mixtures of these which have been chlorinated or brominated to contain at least two halogen atoms per benzene ring, are suitable polyphenyl reactants. Preferably, halogenated polyphenyls containing at least about three halogen atoms per benzene ring are employed in the reaction to obtain the most desirable compounds.

When carried out under moderate conditions, the reaction proceeds almost entirely to the addition of one amine molecule to each end of the polyphenyl chain, thereby forming the halogenated polyphenyl bis(alkyleneamine) as the main product. Only with great difficulty are additional amine molecules induced to react with halogens on either the once-substituted end benzene rings or an inner benzene ring, for example in a terphenyl. The reaction appears effectively to end when each benzene ring in the polyphenyl chain has two organic groups attached to it.

The reaction is ordinarily carried out by contacting the two reactants at about 75–250° C. for about 1–30 hours. Lower or higher temperatures may be used, but reaction is undesirably slow below 75° C. and temperatures above 250° C. cause increasingly rapid thermal decomposition of reactants or product. The reflux temperature of the reaction mixture is often a convenient level of operation.

Reaction under substantially atmospheric pressure is usually preferable, but subatmospheric or superatmospheric reaction pressures may be used if desired.

Solvents which are inert to the reactants and products under the conditions specified may be used as reaction media, but these are not necessary and are not desirable in most cases. Hydrocarbons of the benzene series, inert halohydrocarbons such as perchlorethylene and fluorinated hydrocarbons, and nitroalkanes are examples of satisfactory solvents.

Hydrogen halide is formed during the reaction and a substantial excess of amine is desirable to absorb this material and thereby drive the reaction to essential completion. About 10–30 moles of amine per mole of halogenated polyphenyl is usually suitable. Other hydrogen halide acceptors may be employed similarly to facilitate completion of the reaction, particularly when it is desirable to conserve the amine reactant.

The product can be separated from the reaction mixture by any one of several conventional procedures. A satisfactory method comprises decomposing the amine hydrohalide byproduct by addition of a base such as an alkali metal hydroxide, distilling off the free amine reactant, and removing by filtration or extraction the alkali halide present. Variations of this procedure or other procedures familiar to those skilled in the art may also be employed and some of these are illustrated in the examples which follow.

The compounds of this invention are materials of somewhat indefinite melting point and are not easily purified. They are generally soluble in organic solvents and essentially insoluble in water.

Example 1

Four hundred grams of a chlorinated biphenyl containing 66.3% chlorine by analysis was added with stirring to 1125 g. of ethylenediamine at about 117° C. in a glass reaction flask over a period of 30 minutes. The resulting solution was then maintained at reflux temperature for 24 hours. The reaction mixture was cooled and about 140 g. of 50% aqueous NaOH was added to neutralize the ethylenediamine hydrochloride formed in the reaction. The ethylenediamine present was removed by distillation under reduced pressure and 400 ml. of toluene was added to the distillation residue. The toluene solution formed was filtered to remove salt and then washed with water until free of inorganic chloride. The washed solution was distilled under reduced pressure to remove the toluene leaving a reddish-brown solid residue amounting to 406 g. This solid was identified by elemental analysis as being impure N,N''-(hexachlorobiphenylylene)bis(ethylenediamine). Found: 45.3% Cl, 10.81% N. Calculated: 45.1% Cl, 11.65% N.

Example 2

In a glass reaction flask, 100 g. of the chlorinated biphenyl used in the previous example was added to 500 g. of diethylenetriamine at 150° C. with stirring over a period of 30 minutes. The reaction mixture was stirred at this temperature for 4 hours, then cooled and 17.6 g. of 50% aqueous NaOH was added. The mixture was worked up as in the previous example. The product obtained was a light brown semisolid material which was identified as before as being crude 1,1'-(hexachlorobiphenylylene)bis(diethylenetriamine). The yield was 119 g. Found by elemental analysis: 39.7% Cl, 13.06% N. Calculated: 38.3% Cl, 14.58% N.

Example 3

By the procedure shown in Example 1, 200 g. of the same polychlorinated biphenyl was reacted with 600 g. of ethanolamine for 3 hours at 176° C. The reaction mixture was then treated with 72 g. of 50% aqueous NaOH and worked up as before. The product was a light brown solid, yield 200 g. This material was identified by analysis and by hydroxyl equivalent weight as being crude 2,2'-(hexachlorobiphenylylene)diiminodiethanol. Elemental analysis showed 46.0% Cl, 5.08% N. Calculated: 45.0% Cl, 5.81% N. The hydroxyl equivalent weight found was 258, calculated 241.2.

Example 4

In the way shown above, 100 g. of the chlorinated biphenyl previously used was reacted with 520 g. of N-(2-hydroxyethyl)ethylenediamine for 6 hours at 160° C. The reaction mixture was then cooled and poured into 2 liters of water. The solid reaction product precipitated and was separated and washed with water until neutral and free of water-soluble chloride. A yield of 113 g. of a light brown solid was thereby obtained. The product was identified as before as being crude 2,2′-(hexachlorobiphenylylene)bis(iminoethyleneimino)diethanol. Elemental analysis showed 38.5% Cl, 8.02% N. Calculated 37.9% Cl, 9.28% N.

*Example 5*

By the procedure of Example 1, 100 g. of terphenyl chlorinated to a chlorine content of 58.3% was reacted with 400 g. of ethylenediamine at 117° C. for 24 hours. The product was obtained in 99.5 g. yield as a reddish-brown solid which was identified as before as being crude N,N″ - (heptachloroterphenylylene)bis(ethylenediamine). This contained 47.0% Cl and 7.43% N. Calculated 41.4% Cl, 9.68% N.

*Example 6*

The chlorinated terphenyl used in Example 5 was reacted with about a 20:1 molar proportion of diethylenetriamine for 6 hours at 160° C. The product was recovered by the method shown in Example 4. It was a brown solid obtained in 94.9% yield based on the chlorinated terphenyl used and identified as before as being crude 1,1′-(heptachloroterphenylylene)bis(triethylenetetramine) Found by analysis: 39.2% Cl, 10.38% N. Calculated 36.1% Cl, 12.69% N.

*Example 7*

Example 6 was repeated using triethylenetetramine in place of diethylenetriamine. A 64.5% yield of crude 1,1′-(heptachloroterphenylylene)bis(triethylenetetramine) was obtained as a brown semisolid. Elemental analysis was consistent with this structure.

*Example 8*

A mixture of 100 g. of chlorinated terphenyl of 58.3% chlorine content and 310 g. of ethanolamine was reacted for 16 hours at 150° C. The reaction product was recovered as in Example 2. A yield of 100 g. of crude 2,2′-(heptachloroterphenylylene)diiminodiethanol was obtained as a brown solid. Elemental analysis and hydroxyl equivalent weight of the product were consistent with the calculated values.

*Example 9*

Example 4 was repeated, replacing the chlorinated biphenyl used therein with a similar molar proportion of chlorinated terphenyl of 58.3% chlorine content. The product was crude 2,2′-(heptachloroterphenylylene)bis-(iminoethyleneimino)diethanol, a brown solid. Chlorine and nitrogen analyses were consistent with the calculated values.

*Example 10*

A quantity of 79 g. of chlorinated terphenyl of 58.3% chlorine content was reacted with excess 1,6-hexanediamine for 16 hours at 180° C. A yield of 96.5 g. of crude N,N″-(heptachloroterphenylylene)bis(1,6 - hexadiamine) was obtained as a brown semisolid by the workup procedure of Example 2. Elemental analysis showed 31.4% Cl, 8.60% N. Calculated: 31.75% Cl, 8.12% N.

*Example 11*

A mixture of 500 g. of ethylenediamine and 100 g. of mixed terphenyls and biphenyl which had been chlorinated to 61.1% chlorine content was heated for 8 hours at 117° C. The reaction mixture was worked up as in Example 1 to obtain 101 g. of a black solid which was found on analysis to contain 48.2% chlorine, 9.44% nitrogen.

By the general procedure shown in the foregoing examples, other alkylene polyamines and alkanolamines are reacted with these and other polyhalogenated polyphenyls to make other compounds of the formula given above. In this way, ethylenediamine is reacted with hexabromobiphenyl to make N,N″-(tetrabromobiphenylylene)bis-(ethylenediamine), 1,3-propanediamine is reacted with octachlorobiphenyl to obtain N,N″-(hexachlorobiphenylylene)bis(1,3-propanediamine), and diethylenetriamine is reacted with octabromoterphenyl to make 1,1′-(hexabromoterphenylylene)bis(diethylenetriamine). Similar analogous and homologous compounds containing bromine or chlorine or both bromine and chlorine substituted on the benzene rings are also easily prepared by this method.

These compounds are useful as the active components of germicidal or antiseptic compositions. For example, the growth of organisms such as *Staphylococcus aureus* and *Salmonella typhosa* in agar is effectively inhibited by the presence therein of as little as 0.05% by weight of the compounds described. Other biological activity shown by these compounds includes the control of pinworms and tapeworms when fed to infected mice as a component of their diet in less than 0.1% by weight concentration.

Since these compounds are diamines or diols as the case may be, they are also useful as intermediates for the preparation of resinous substances such as polyesters and polyamides.

I claim:

1. A compound of the formula

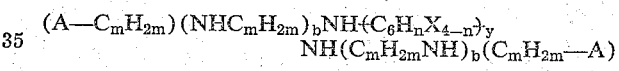

$$(A-C_mH_{2m})(NHC_mH_{2m})_bNH(C_6H_nX_{4-n})_y$$
$$NH(C_mH_{2m}NH)_b(C_mH_{2m}-A)$$

wherein $b$ and $n$ are numbers from zero to about 3, $m$ is a number from two to about six, $y$ is a number from two to about three, X is halogen of atomic number from 17 to 35, and A is selected from the group consisting of OH and $NH_2$.

2. N,N″ - (hexachlorobiphenylylene)bis(ethylenediamine).

3. 1,1′ - (hexachlorobiphenylylene)bis(diethylenetriamine).

4. 2,2′-(hexachlorobiphenylylene)diiminodiethanol.

5. 2,2′ - (hexachlorobiphenylylene)bis(iminoethyleneimino)diethanol.

6. N,N″ - heptachloroterphenylylene)bis(ethylenediamine).

7. 1,1′ - (heptachloroterphenylylene)bis(diethylenetriamine).

8. 1,1′ - (heptachloroterphenylylene)bis(triethylenetetramine).

9. 2,2′-(heptachloroterphenylylene)diiminodiethanol.

10. 2,2′ - (heptachloroterphenylylene)bis(iminoethyleneimino)diethanol.

11. N,N″-(heptachloroterphenylylene)bis(1,6-hexanediamine).

References Cited in the file of this patent

Rocklin: Chemical Abstracts, vol. 51, page 17786i (1957).